(12) United States Patent
Nakagawa

(10) Patent No.: US 10,440,218 B2
(45) Date of Patent: Oct. 8, 2019

(54) IMAGE PROCESSING APPARATUS, CONTROL METHOD FOR IMAGE PROCESSING APPARATUS, AND NON-TRANSITORY COMPUTER-READABLE RECORDING MEDIUM

(71) Applicant: CANON KABUSHIKI KAISHA, Tokyo (JP)

(72) Inventor: Koichi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 15/351,199

(22) Filed: Nov. 14, 2016

(65) Prior Publication Data

US 2017/0149997 A1 May 25, 2017

(30) Foreign Application Priority Data

Nov. 19, 2015 (JP) .................................. 2015-226723

(51) Int. Cl.
*H04N 1/21* (2006.01)
*H04N 9/87* (2006.01)

(52) U.S. Cl.
CPC ............... *H04N 1/212* (2013.01); *H04N 9/87* (2013.01)

(58) Field of Classification Search
CPC .................................. H04N 1/212; H04N 9/87
See application file for complete search history.

(56) References Cited

U.S. PATENT DOCUMENTS

| | | | | |
|---|---|---|---|---|
| 9,460,544 B2* | 10/2016 | Johansson | ............. | G06T 15/205 |
| 9,776,566 B2* | 10/2017 | Ishimoto | ................. | E02F 9/262 |
| 2009/0135265 A1* | 5/2009 | Kawamura | ............ | H04N 5/232 348/220.1 |
| 2011/0134260 A1* | 6/2011 | Cho | ....................... | H04N 5/232 348/220.1 |
| 2014/0308018 A1* | 10/2014 | Ise | ..................... | H04N 5/23245 386/225 |
| 2015/0269966 A1* | 9/2015 | Sakakibara | .......... | G11B 27/005 386/356 |
| 2016/0012562 A1* | 1/2016 | Sanno | ................. | H04N 19/159 348/221.1 |
| 2016/0119576 A1* | 4/2016 | Takeda | ................... | H04N 5/772 348/220.1 |

FOREIGN PATENT DOCUMENTS

JP 4201439 B2 12/2008

* cited by examiner

*Primary Examiner* — Mishawn N. Hunter
(74) *Attorney, Agent, or Firm* — Canon U.S.A., Inc. I.P. Division

(57) ABSTRACT

One or more image processing apparatuses, one or more control methods therefor, and one or more storage mediums for use with same are provided herein. In at least one embodiment provided herein, an image processing apparatus includes a determining unit configured to selectively determine from a plurality of data formats a data format of still image data generated from un-development moving image data which may have a readjustable focal position, an instructing unit configured to instruct to output the still image data, and a generating unit configured to generate from the un-development moving image data the still image data in the data format determined by the determining unit in a case where the instructing unit instructs to output the still image data.

18 Claims, 13 Drawing Sheets

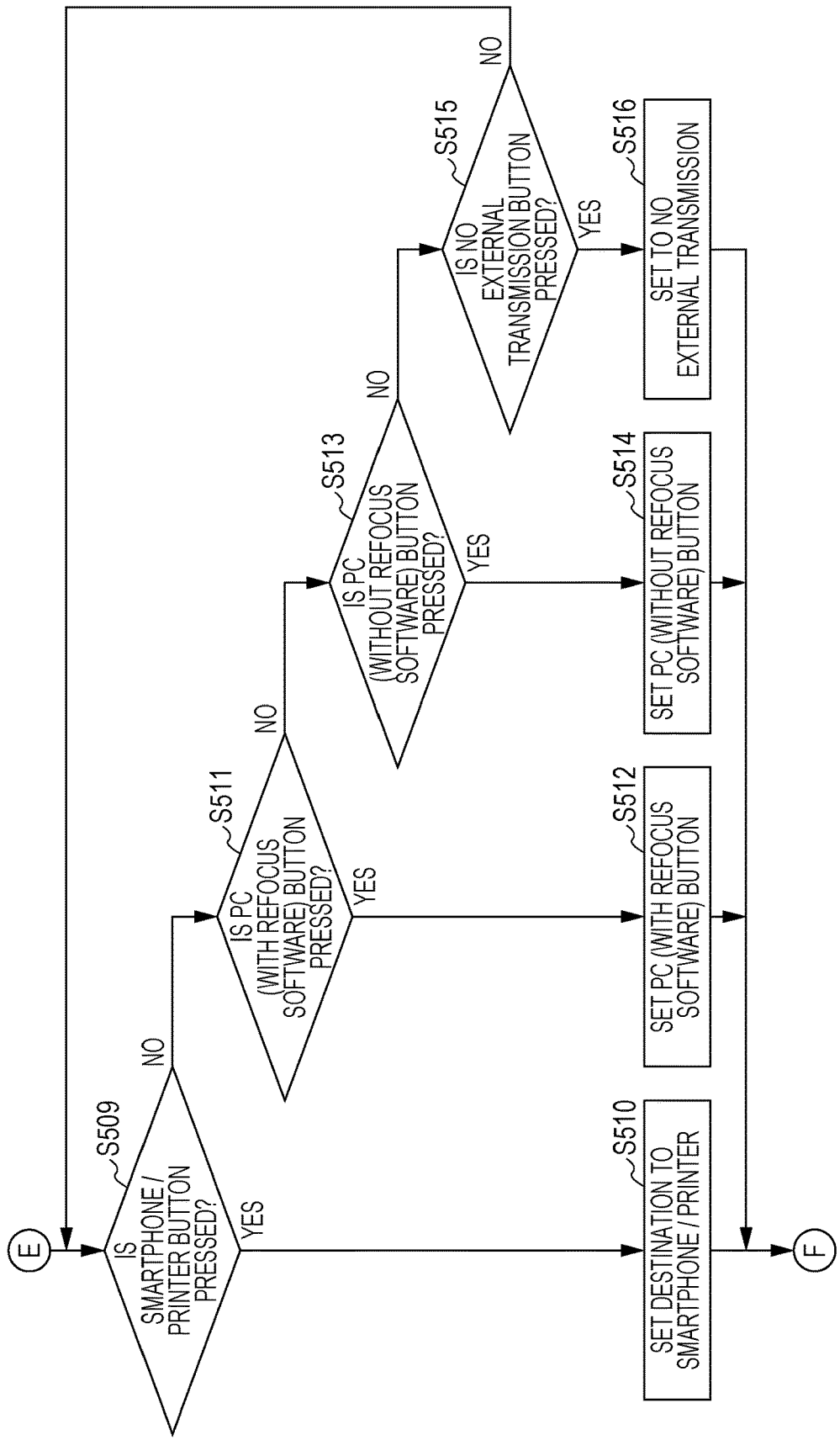

IMAGE PROCESSING APPARATUS, CONTROL METHOD FOR IMAGE PROCESSING APPARATUS, AND NON-TRANSITORY COMPUTER-READABLE RECORDING MEDIUM

BACKGROUND OF THE INVENTION

Field of the Invention

The present disclosure relates to an image processing apparatus, a control method for an image processing apparatus, and a non-transitory computer-readable recording medium.

Description of the Related Art

A still-image capturing apparatus has been proposed in the past which records a moving image from television broadcasting or input through a camera as a still image (Japanese Patent No. 4201439). Also, a video camera has been proposed which records, as a still image, a moving image while being played.

In these apparatuses, when a user presses a button for capturing a still image, an image of a frame being displayed at that time point may be recorded as a still image in a storage device, for example.

However, such technologies in the past merely record an image of a frame being displayed as a still image.

SUMMARY OF THE INVENTION

An aspect of at least one embodiment of the present disclosure provides an image processing apparatus including a determining unit configured to selectively determine from a plurality of data formats a data format of still image data generated from un-development moving image data having a readjustable focal position, an instructing unit configured to instruct to output the still image data, and a generating unit configured to generate from the un-development moving image data the still image data in the data format determined by the determining unit in a case where the instructing unit instructs to output the still image data.

According to other aspects of the present disclosure, one or more additional image processing apparatuses, one or more control methods therefor, and one or more storage mediums for use with same are discussed herein. Further features of the present disclosure will become apparent from the following description of exemplary embodiments with reference to the attached drawings.

BRIEF DESCRIPTION OF THE DRAWINGS

FIG. 13B is a flowchart illustrating operations in the image processing apparatus according to the third exemplary embodiment of the present disclosure.

DESCRIPTION OF THE EMBODIMENTS

First Exemplary Embodiment

Figure 1:
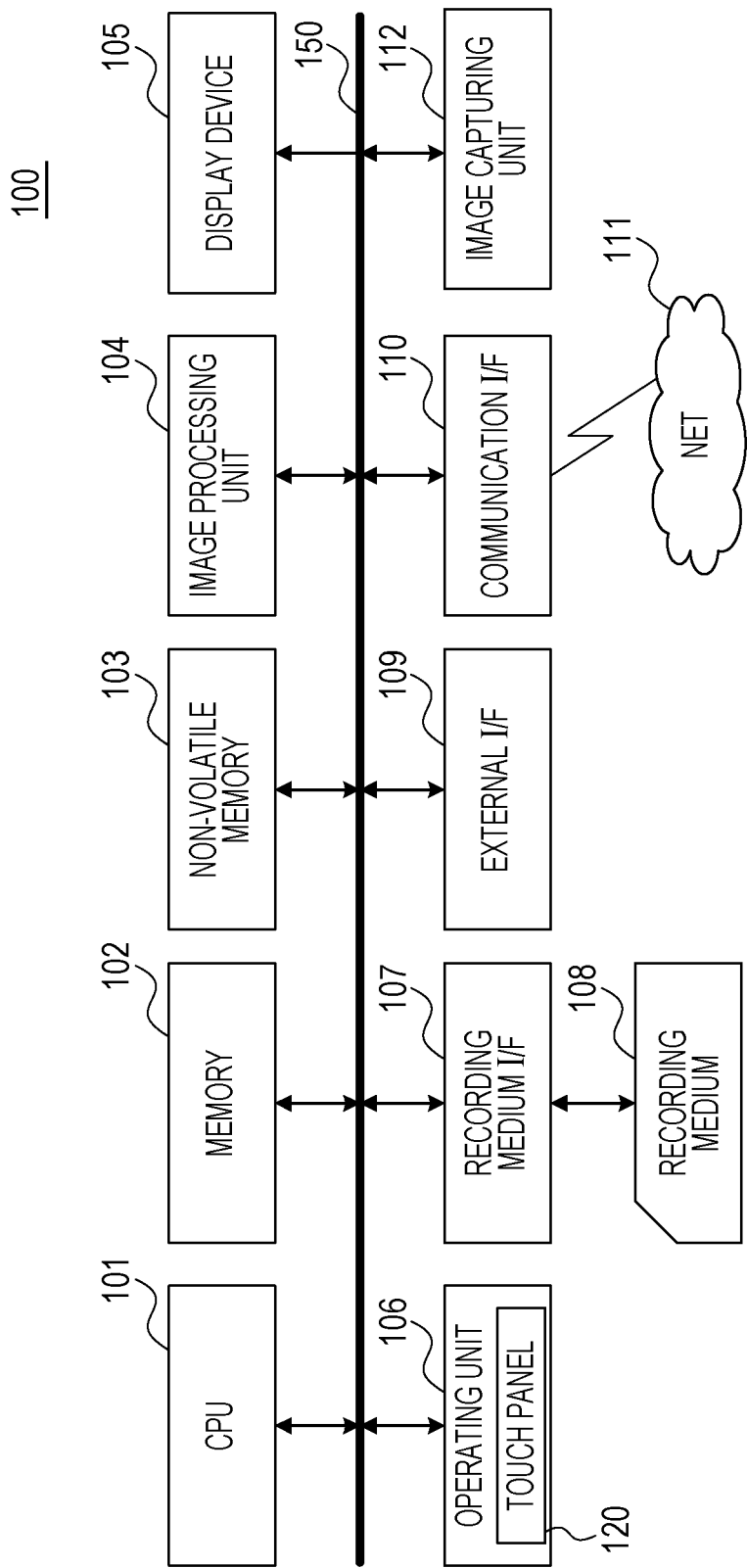
FIG. 1 is a block diagram illustrating a configuration of an image processing apparatus according to a first exemplary embodiment of the present disclosure.

An image processing apparatus according to a first exemplary embodiment of the present disclosure will be described with reference to FIGS. 1 to 8. FIG. 1 is a block diagram illustrating a configuration of the image processing apparatus according to this exemplary embodiment. An image processing apparatus 100 according to this exemplary embodiment may be an imaging apparatus, for example, and, more specifically, may be a digital video camera or a digital camera, for example.

A CPU 101, a memory 102, a non-volatile memory 103, an image processing unit 104, a display device 105, an operating unit 106, a recording medium I/F 107, an external I/F 109, a communication I/F 110, and an image capturing unit 112 are connected to an internal bus 150. The components connected to the internal bus 150 are capable of exchanging data with each other via the internal bus 150.

The memory 102 may include a volatile memory using a semiconductor device, for example, and may be a RAM, for example. The CPU 101 controls components of the image processing apparatus 100 by using the memory 102 as a working memory on basis of a program stored in the non-volatile memory 103, for example. The non-volatile memory 103 may store image data, audio data, and other data, and programs for operating the CPU 101. The non-volatile memory 103 may be a hard disk drive (HDD), a ROM or the like.

The image processing unit 104 performs image processing on image data under control of the CPU 101. Image data having undergone image processing may be, for example, image data stored in the non-volatile memory 103 or the recording medium 108 or a video signal acquired through the external I/F 109. Image data subject to image processing may be, for example, image data acquired through the communication I/F 110 or image data captured by the image capturing unit 112. The image processing unit 104 may perform image processing such as A/D conversion processing, D/A conversion processing, encoding processing, compression processing, decoding processing, enlargement/reduction processing (resizing), noise reduction processing, color conversion processing, development processing, and refocus processing. The image processing unit 104 may include dedicated elements for performing specific image processing. Some types of image processing may be performed by the CPU 101 on image data in accordance with a program, without using the image processing unit 104. The development processing includes at least one of de-mosaic processing, white balance processing and gamma correction processing for.

The display device 105 may display an image and a GUI (Graphical User Interface) screen included in a GUI under control of the CPU 101. The CPU 101 generates a display control signal in accordance with a program and controls the components of the image processing apparatus 100 in accordance with the display control signal. Thus, a video signal (or an image signal) for display on the display device 105 is generated by the components of the image processing apparatus 100, and the video signal is output to the display device 105. The display device 105 is configured to display video on basis of the video signal.

The operating unit 106 may be an input device for receiving a user operation. The operating unit 106 may be a text information input device such as a keyboard, a pointing device such as a mouse and a touch panel 120, a button, a dial, a joy stick, a touch sensor, or a touch pad. The touch panel 120 is an input device two-dimensionally provided over the display device 105 and is configured to output coordinate information based on a touched position.

The recording medium 108 such as a memory card, a CD, and a DVD is installable to the recording medium I/F 107. The recording medium I/F 107 may read out data from the recording medium 108 and write data to the recording medium 108 under control of the CPU 101.

The external I/F 109 is an interface which connects the image processing apparatus 100 and an external device in a wired or wireless manner for input/output of a video signal and an audio signal.

The communication I/F 110 is an interface which enables communication (including telephone communication) between the image processing apparatus 100 and an external device over the Internet 111 for transmitting and receiving data of a file and a command. Alternatively, the communication I/F 110 may be an interface which enables communication between the image processing apparatus 100 and an external device without over the Internet 111.

The image capturing unit 112 may include an image pickup device such as a CCD sensor and a CMOS sensor, a zoom lens, a focus lens, a shutter, an iris, a distance-measuring unit, and an A/D converter. The image capturing unit 112 is capable of acquiring a still image and a moving image. Data of an image or image data acquired by the image capturing unit 112 may be transmitted to the image processing unit 104, undergo a process performed by the image processing unit 104, and then are recorded in the recording medium 108 as a still image file or a moving image file.

The CPU 101 is capable of detecting operations on and states of the touch panel 120 as follows. That is, the CPU 101 may detect that the touch panel 120 has been touched by a finger or a stylus pen (hereinafter, called a Touch-Down). The CPU 101 may further detect that the touch panel 120 is being touched by a finger or a stylus pen (hereinafter, called a Touch-On). The CPU 101 may further detect that a finger or a stylus pen is moving with the finger or stylus pen kept in contact with on the touch panel 120 (hereinafter, called a move). The CPU 101 may further detect that the finger or stylus pen on the touch panel 120 is moved off the touch panel 120 (hereinafter, called a Touch-Up). The CPU 101 may further detect that nothing is in contact with the touch panel 120 (hereinafter, called a Touch-Off).

Information describing an operation or a state as described above and information describing coordinate of a position of a touch of a finger or a stylus pen on the touch panel 120 are notified to the CPU 101 via the internal bus 150. The CPU 101 determines what kind of operation is performed on the touch panel 120 on basis of the notified information. As to a move, the moving direction of a finger or a stylus pen moving on the touch panel 120 may further be determined with respect to each of a vertical component and a horizontal component on the touch panel 120 on basis of a change in the positional coordinates. An operation including a Touch-Down followed by a Touch-Up through a certain move is called an operation drawing a stroke. An operation drawing a stroke quickly is called a flick. The flick corresponds to an operation including quickly moving a finger on the touch panel 120 by a certain distance and then directly moving the finger off the touch panel 120 or an operation quickly tracing the touch panel 120 like flipping. In a case where a movement by a predetermined distance and at a predetermined speed is detected and a Touch-Up is then directly detected, it may be determined that the flick has been performed. In a case where a movement by the predetermined distance or longer and at a speed lower than the predetermined speed is detected, it may be determined that a drag has been performed. The touch panel 120 may be a touch panel of any one of various types such as resistance film, capacitance, surface acoustic wave, infrared, electromagnetic induction, image recognition, and optical sensor touch panels.

In the image processing apparatus 100 according to this exemplary embodiment, a moving-image playback screen for implementing a function relating to moving image playback is displayed on the display device 105. On the moving-image playback screen, buttons for receiving operations may be displayed over a moving image to be played.

Figure 2:
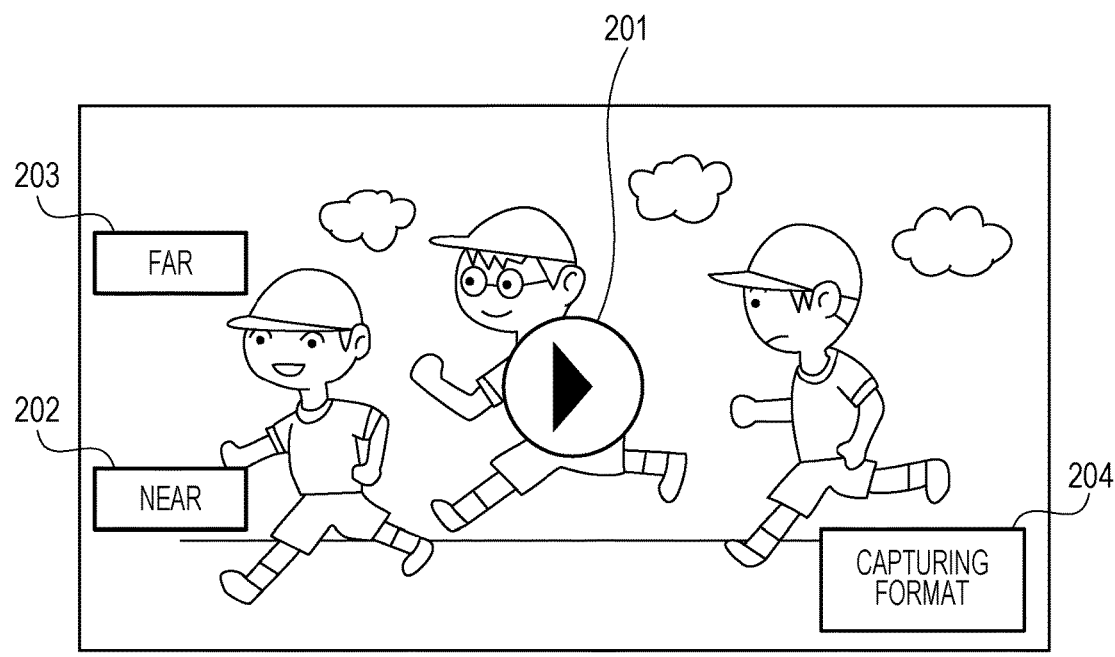
FIG. 2 illustrates an example display of a moving-image playback screen in the image processing apparatus according to the first exemplary embodiment of the present disclosure.

FIG. 2 illustrates an example display of a moving-image playback screen in the image processing apparatus according to this exemplary embodiment. When a playback button 201 is pressed down, playback of a moving image is started. When a NEAR button 202 is pressed down, a refocus position is moved toward a minimum-object-distance side by one step. When a FAR button 203 is pressed down, the refocus position is moved toward an infinite end side by one step. When a capturing format selection button 204 is pressed down, a capturing format selection screen (capturing format setting screen) is displayed which is usable for selecting a format of a still image to be captured.

Figure 3:
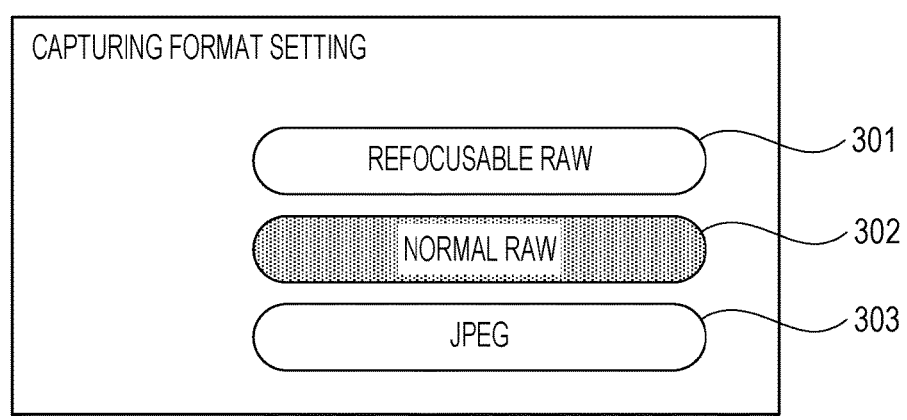
FIG. 3 illustrates an example display of a capturing format setting screen in the image processing apparatus according to the first exemplary embodiment of the present disclosure.

FIG. 3 illustrates an example display of a capturing format selection screen in the image processing apparatus according to this exemplary embodiment. As illustrated in FIG. 3, the capturing format selection screen may display a menu name "still image capturing format setting". The capturing format selection screen displays a plurality of selection items including, more specifically, a refocusable RAW still image format button 301, a normal RAW still image format button 302 and a JPEG still image format button 303. The refocusable RAW still image format button 301 is displayed as "REFOCUSABLE RAW" on the capturing format selection screen. The normal RAW still image format button 302 is displayed as "NORMAL RAW" on the capturing format selection screen. The JPEG still image format button 303 is displayed as "JPEG" on the capturing format selection screen. When the refocusable RAW still image format button 301 is pressed down, a refocusable RAW still image that is a still image having a readjustable focus position is set as a capturing format. In this case, un-development still image data are formed which has a readjustable focal position. When the normal RAW still image format button 302 is pressed down, a RAW still image that is a normal still image having a focus position that is not readjustable (hereinafter, called a normal RAW still image) is set as a capturing format. In this case, un-development still image data whose focal position is not readjustable is formed. When the JPEG still image format button 303 is pressed down, a JPEG still image whose focus position is not readjustable or a still image encoded in a JPEG format is set as a capturing format. In this case, still image data are formed on basis of developed image information whose focal position is not readjustable.

The display device 105 displaying a capturing format selection screen, the touch panel 120 and the CPU 101 function in collaboration as a determining unit configured to selectively determine a data format for still image data from a plurality of data formats. In other words, the display device 105 displaying the capturing format selection screen, the touch panel 120 and the CPU 101 function in collaboration as a determining unit configured to determine a capturing format.

When a capture button (not illustrated) provided in the operating unit 106 is pressed down while a moving image is being played, the image processing apparatus 100 according to this exemplary embodiment operates as follows. That is, in that case, the image processing apparatus 100 according to this exemplary embodiment captures a still image corresponding to an image being displayed on basis of a capturing format selected on the capturing format selection screen (see FIG. 2). The captured still image is generated as a file, and the file is saved in the recording medium 108.

Figure 6:
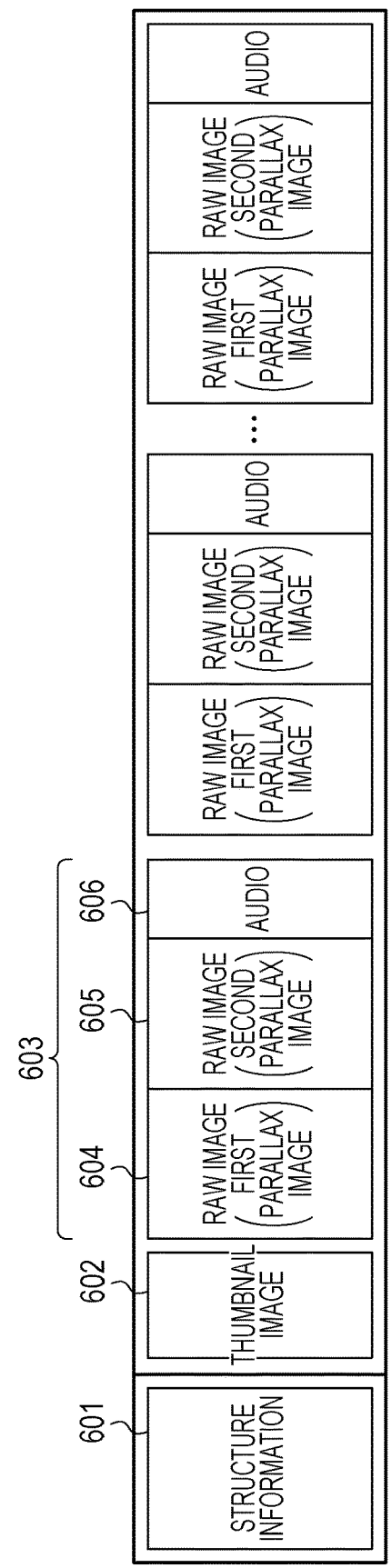
FIG. 6 illustrates a data structure of a file of a refocusable RAW moving image generated in the image processing apparatus according to the first exemplary embodiment of the present disclosure.

FIG. 6 illustrates a data structure of a file of a refocusable RAW moving image generated by the image processing apparatus according to this exemplary embodiment. The data of the refocusable RAW moving image are un-development moving image data having a readjustable focal position. As illustrated in FIG. 6, a file of a refocusable RAW moving image (hereinafter, called a refocusable RAW moving image file) includes a block 601 storing structure information regarding the file, and the block 601 holds information describing that what kind of data are arranged in what kind of order within the file. The refocusable RAW moving image file further includes a block 602 storing a thumbnail image. The refocusable RAW moving image file further includes a plurality of blocks 603 each storing data for one frame of the refocusable RAW moving image. Each of the blocks 603 includes RAW images 604 and 605 having a parallax from each other, that is, a first parallax (viewpoint) image 604 and a second parallax (viewpoint) image 605 and audio data 606. The number of the blocks 603 is matched with a total number of frames of the refocusable RAW moving image.

Figure 7:
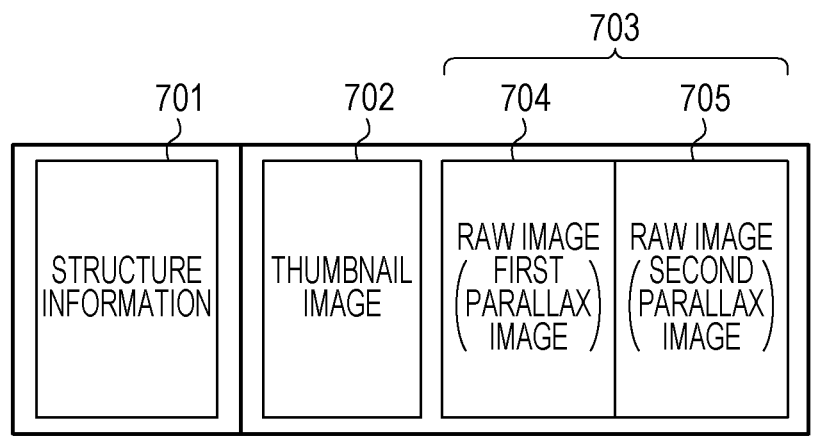
FIG. 7 illustrates a data structure of a file of a refocusable RAW still image generated in the image processing apparatus according to the first exemplary embodiment of the present disclosure.

FIG. 7 illustrates a data structure of a refocusable RAW still image file generated by the image processing apparatus according to this exemplary embodiment. The refocusable RAW still image file includes a block 701 storing structure information, and the block 701 holds information describing that what kind of data are arranged in what kind of order within the file. The refocusable RAW still image file further includes a block 702 storing a thumbnail image. The refocusable RAW still image file further includes a block 703 storing a refocusable RAW still image, and the block 703 has RAW images 704 and 705 having a parallax from each other, that is, a first parallax image 704 and a second parallax image 705.

Figure 8:
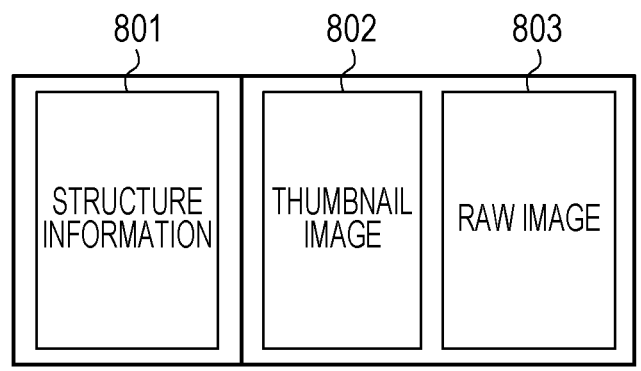
FIG. 8 is a data structure of a file of a normal RAW still image generated in the image processing apparatus according to the first exemplary embodiment of the present disclosure.

FIG. 8 illustrates a data structure of a normal RAW still image file generated by the image processing apparatus according to this exemplary embodiment. As illustrated in FIG. 8, the normal RAW moving image file includes a block 801 storing structure information, and the block 801 holds information describing that what kind of data are arranged in what kind of order within the file. The normal RAW still image file further includes a block 802 storing a thumbnail image. The normal RAW still image file further includes a block 803 storing a normal RAW still image, and the block 803 includes one RAW image.

Figure 4A:
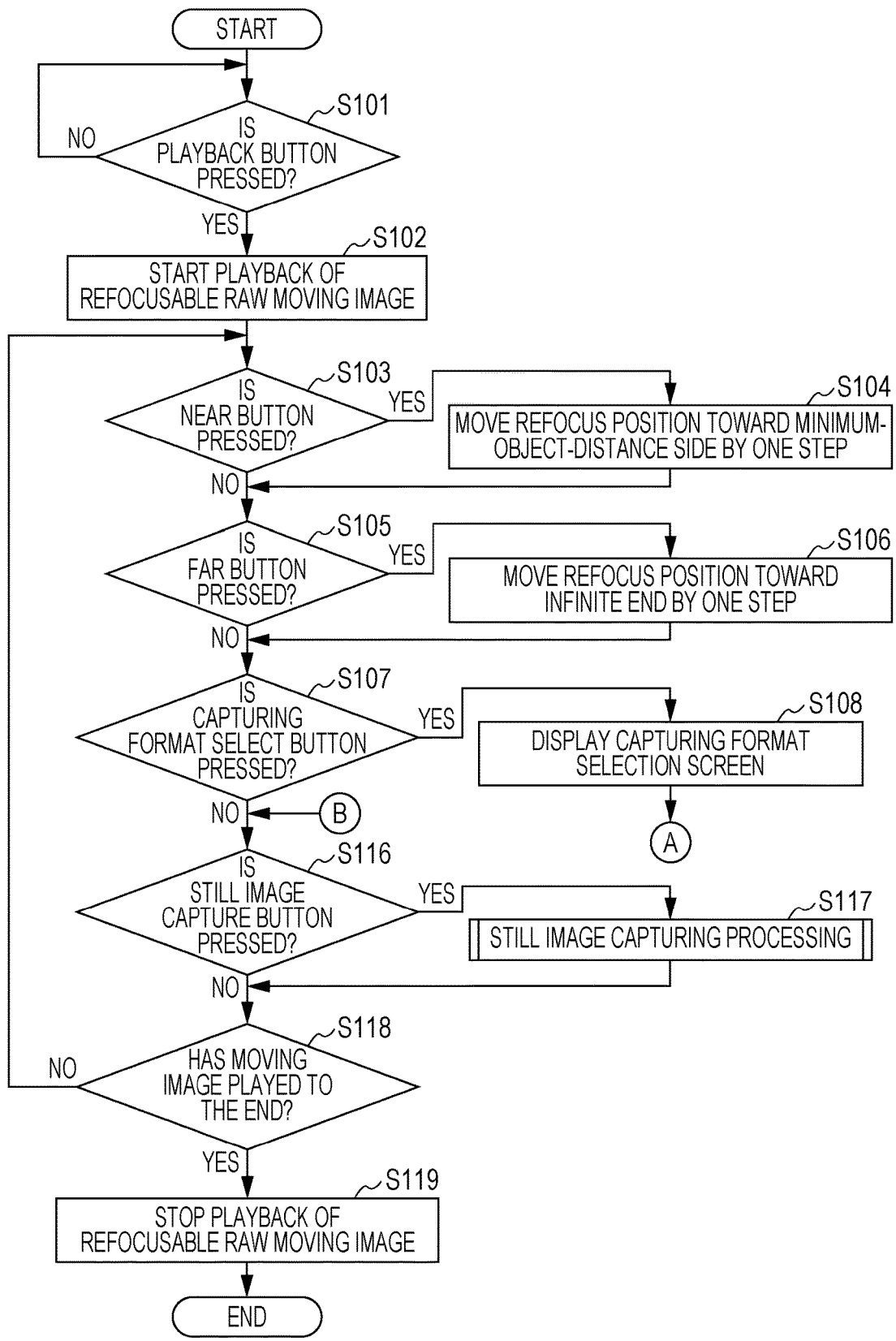
FIGS. 4A and 4B are flowcharts illustrating operations in the image processing apparatus according to the first exemplary embodiment of the present disclosure.
Figure 4B:
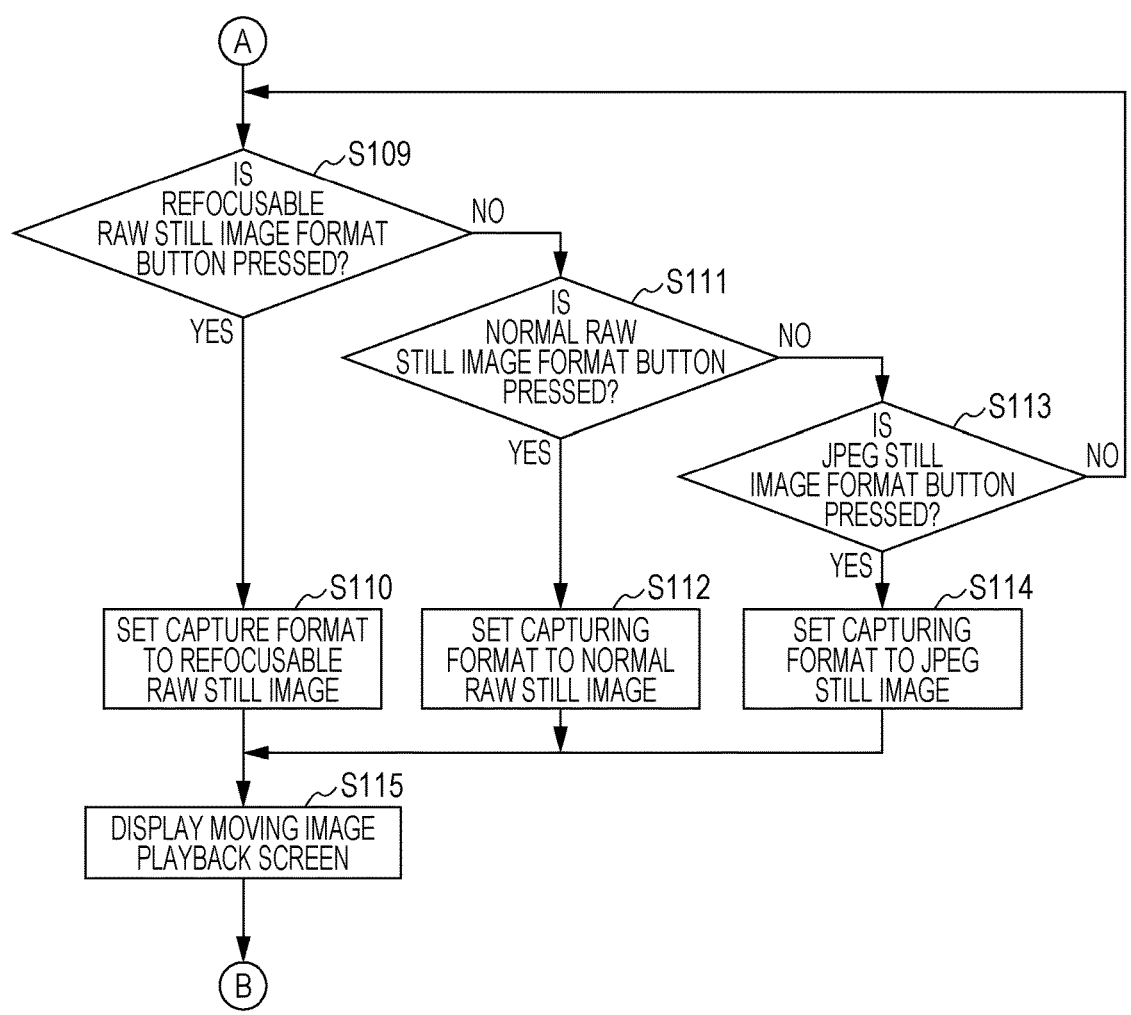

Next, operations in the image processing apparatus according to this exemplary embodiment will be described with reference to FIGS. 4A and 4B. FIGS. 4A and 4B are flowcharts illustrating operations in the image processing apparatus according to this exemplary embodiment.

In step S101, the CPU 101 determines whether the playback button 201 displayed on the touch panel 120 is pressed down or not. If the CPU 101 detects that the playback button 201 is pressed down (YES in step S101), the processing moves to step S102. If the CPU 101 does not detect that playback button 201 is pressed down (NO in step S101), the processing moves to step S101.

In step S102, the CPU 101 controls the image processing unit 104 to reproduce a refocusable RAW moving image. The image processing unit 104 reads out a refocusable RAW moving image from the recording medium 108 and performs a development process on the refocusable RAW moving image so that a video signal that is displayable can be generated and the video signal is output to the display device 105. Thus, the refocusable RAW moving image can be played by the display device 105.

The CPU 101 and the image processing unit 104 in collaboration function as a reproducing unit configured to develop and reproduce a refocusable RAW moving image.

In step S103, the CPU 101 determines whether the NEAR button 202 displayed on the touch panel 120 is pressed down or not. If the CPU 101 detects that the NEAR button 202 is pressed down (YES in step S103), the processing moves to step S104. On the other hand, if the CPU 101 does not detect that the NEAR button 202 is pressed down (NO in step S103), the processing moves to step S105.

In step S104, the CPU 101 controls the image processing unit 104 such that the refocus position of the refocusable RAW moving image can be moved toward the minimum-object-distance side by one step from the current position. The image processing unit 104 reads out the current refocus position from the memory 102. The image processing unit 104 then moves the refocus position toward the minimum-object-distance side by one step from the current refocus position in the frames subsequent to the frame being played current for performing a development process. The CPU 101 stores the refocus position after the movement to the memory 102. After that, the processing moves to step S105.

In step S105, the CPU 101 determines whether the FAR button 203 displayed on the touch panel 120 is pressed down or not. If the CPU 101 detects that the FAR button 203 is pressed down (YES in step S105), the processing moves to step S106. On the other hand, if the CPU 101 does not detect that the FAR button 203 is pressed down (NO in step S105), the processing moves to step S107.

In step S106, the CPU 101 controls the image processing unit 104 such that the refocus position of the refocusable RAW moving image can be moved toward the infinite end by one step from the current position. The image processing unit 104 reads out the current refocus position from the memory 102. The image processing unit 104 moves the refocus position toward the infinite end side by one step from the current refocus position in frames subsequent to the frame being played currently for performing a development process. The CPU 101 stores the refocus position after the movement in the memory 102. After that, the processing moves to step S107.

In step S107, the CPU 101 determines whether the capturing format selection button 204 displayed on the touch panel 120 is pressed down or not. If the CPU 101 detects that the capturing format selection button 204 is pressed down (YES in step S107), the processing moves to step S108. On the other hand, if the CPU 101 does not detect that the capturing format selection button 204 is pressed down (NO in step S107), the processing moves to step S116.

In step S108, the CPU 101 controls the image processing unit 104 to display the capturing format selection screen. Thus, the capturing format selection screen is displayed on the display device 105. After that, the processing moves to step S109.

In step S109, the CPU 101 determines whether the refocusable RAW still image format button 301 displayed on the touch panel 120 is pressed down or not. If the CPU 101 detects that the refocusable RAW still image format button 301 is pressed down (YES in step S109), the processing moves to step S110. On the other hand, if the CPU 101 does not detect that the refocusable RAW still image format button 301 is pressed down (NO in step S109), the processing moves to step S111.

In step S110, the CPU 101 sets a capturing format for the refocusable RAW still image. More specifically, the CPU 101 writes to the memory 102 information describing that the capturing format is the refocusable RAW still image format. After that, the processing moves to step S115.

In step S111, the CPU 101 determines whether the normal RAW still image format button 302 displayed on the touch panel 120 is pressed down or not. If the CPU 101 detects that the normal RAW still image format button 302 is pressed down (YES in step S111), the processing moves to step S112. On the other hand, if the CPU 101 does not detect that the normal RAW still image format button 302 is pressed down (NO in step S111), the processing moves to step S113.

In step S112, the CPU 101 sets the capturing format to normal RAW still image. More specifically, the CPU 101 writes to the memory 102 information describing that the capturing format is the normal RAW still image format. After that, the processing moves to step S115.

In step S113, the CPU 101 determines whether the JPEG still image format button 303 displayed on the touch panel 120 is pressed down or not. If the CPU 101 detects that the JPEG still image format button 303 is pressed down (YES in step S113), the processing moves to step S114. On the other hand, if the CPU 101 does not detect that the JPEG still image format button 303 is pressed down (NO in step S113), the processing returns to step S109.

In step S114, the CPU 101 sets the capturing format to JPEG still image. More specifically, the CPU 101 writes to the memory 102 information describing that the capturing format is the JPEG still image format. After that, the processing moves to step S115.

In step S115, the CPU 101 controls the image processing unit 104 to display the moving-image playback screen. Thus, the moving-image playback screen is displayed on the display device 105. After that, the processing moves to step S116.

In step S116, the CPU 101 determines whether a still image capture button (not illustrated) provided in the operating unit 106 is pressed down or not. If the CPU 101 detects that the still image capture button is pressed down (YES in step S116), the processing moves to step S117. On the other hand, if the CPU 101 does not detect that the still image capture button is pressed down (NO in step S116), the processing moves to step S118. The still image capture button provided in the operating unit 106 functions as an instructing unit configured to instruct to generate still image data.

In step S117, the CPU 101 performs still-image capturing processing such that a still image file can be generated in a format based on the preset capturing format. As described above, information regarding the preset capturing format is stored in the memory 102. Details of the still-image capturing processing will be described below with reference to FIG. 5. After the still-image capturing processing ends, the processing moves to step S118. The CPU 101 and the image processing unit 104 in collaboration function as a generating unit configured to generate, from a refocusable RAW moving image, still image data in a data format determined by the determining unit configured to determine a data format of still image data.

In step S118, the CPU 101 inquires of the image processing unit 104 whether the refocusable RAW moving image has been played to the end or not. If the refocusable RAW moving image has been played to the end (YES in step S118), the processing moves to step S119. On the other hand, if the refocusable RAW moving image has not been played to the end (NO in step S118), the processing returns to step S103.

In step S119, the CPU 101 stops the playback of the refocusable RAW moving image.

Figure 5:
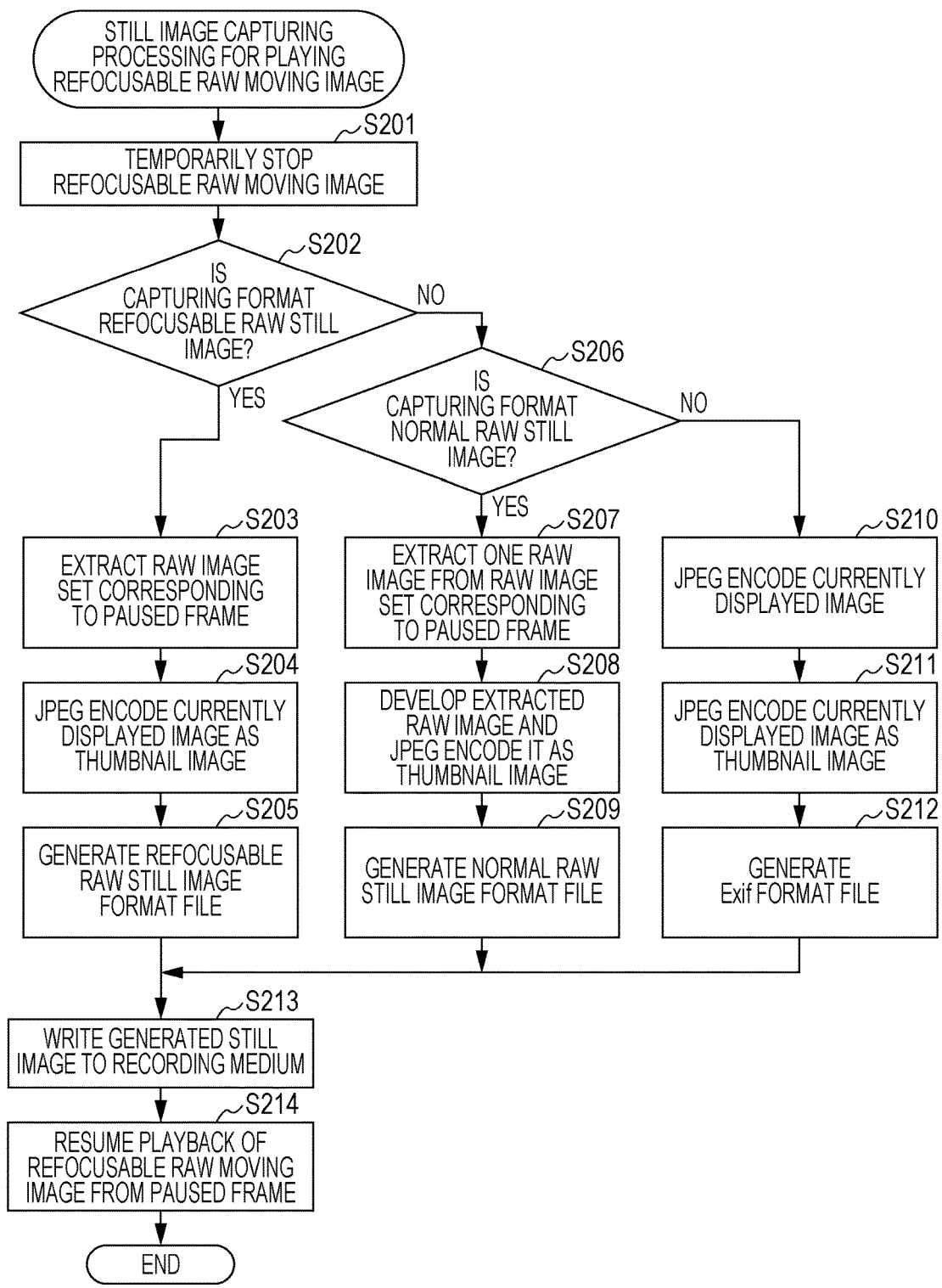
FIG. 5 is a flowchart illustrating still-image capturing processing to be performed in the image processing apparatus according to the first exemplary embodiment of the present disclosure.

Next, the still-image capturing processing will be described with reference to FIG. 5. FIG. 5 is a flowchart illustrating still-image capturing processing to be performed in the image processing apparatus according to this exemplary embodiment.

In step S201, the CPU 101 controls the image processing unit 104 such that the refocusable RAW moving image that is currently being played can be paused. The image processing unit 104 stops reading the refocusable RAW moving image from the recording medium 108 and operates to directly hold the video signal being currently output to the display device 105. After that, the processing moves to step S202.

In step S202, the CPU 101 reads out from the memory 102 information describing a preset capturing format. The CPU 101 determines whether the preset capturing format is the refocusable RAW still image format or not. If the preset capturing format is the refocusable RAW still image format (YES in step S202), the processing moves to step S203. On the other hand, if the capturing format is not the refocusable RAW still image format (NO in step S202), the processing moves to step S206.

In step S203, the CPU 101 accesses a region recording the refocusable RAW moving image in the recording medium 108. A RAW image set corresponding to the paused frame being currently displayed on the display device 105 is retrieved from the recording medium 108, and the retrieved RAW image set is copied to the memory 102. After that, the processing moves to step S204.

In step S204, the CPU 101 controls the image processing unit 104 such that the image being currently displayed on the display device 105 can be JPEG-encoded as a thumbnail image. The image processing unit 104 JPEG-encodes a video signal currently output to the display device 105 and stores the encoded JPEG data to the memory 102. After that, the processing moves to step S205.

In step S205, the CPU 101 accesses the memory 102, and the CPU 101 combines the RAW image set copied to the memory 102 in step S203 and the JPEG data stored in the memory 102 in step S204. The CPU 101 generates a file in the refocusable RAW still image format and stores the generated file to the memory 102. After that, the processing moves to step S213.

In step S206, the CPU 101 reads out from the memory 102 information describing the preset capturing format. Then, the CPU 101 determines whether the preset capturing format is the normal RAW still image format or not. If the set capturing format is the normal RAW still image format (YES in step S206), the processing moves to step S207. On the other hand, if the set capturing format is not the normal RAW still image format (NO in step S206), the processing moves to step S210.

In step S207, the CPU 101 accesses a region recording the refocusable RAW moving image in the recording medium 108. One RAW image is extracted from the RAW image set corresponding to the paused frame being currently displayed on the display device 105, and the extracted RAW image is copied to the memory 102. After that, the processing moves to step S208.

In step S208, the CPU 101 controls the image processing unit 104 such that the RAW image copied to the memory 102 in step S207 can be JPEG-encoded to generate a thumbnail image. The image processing unit 104 accesses the memory 102, performs a development process on the RAW image copied in step S102, then JPEG-encodes the developed image, and stores the encoded JPEG data to the memory 102. After that, the processing moves to step S209.

In step S209, the CPU 101 accesses the memory 102 and combines the one RAW image copied in step S207 and the JPEG data stored in step S208. The CPU 101 then generates a normal RAW still image format file and stores the generated file to the memory 102. After that, the processing moves to step S213.

In step S210, the CPU 101 controls the image processing unit 104 to JPEG-encode the image being currently displayed on the display device 105. The image processing unit 104 JPEG-encodes a video signal being currently output to the display device 105 and stores the encoded JPEG data, that is, main image data in JPEG format in the memory 102. After that, the processing moves to step S211.

In step S211, the CPU 101 controls the image processing unit 104 to JPEG-encode the image being currently displayed on the display device 105 as a thumbnail image. The image processing unit 104 JPEG-encodes a video signal being currently output to the display device 105 and stores the encoded JPEG data to the memory 102. After that, the processing moves to step S212.

In step S212, the CPU 101 accesses the memory 102 and performs processes as will be described below. That is, the CPU 101 combines JPEG data or main image data in JPEG format stored in the memory 102 in step S211 and JPEG data for a thumbnail image stored in the memory 102 in step S211. Thus, the CPU 101 generates a file in Exif format (Exchangeable image file format), for example, and stores the file in the memory 102. After that, the processing moves to step S213.

In step S213, the CPU 101 reads out from the memory 102 the file generated in step S205, step S209 or step S212 and stored in the memory 102. The CPU 101 writes the file read out from the memory 102 to the recording medium 108.

In step S214, the CPU 101 controls the image processing unit 104 such that the refocusable RAW moving image that is currently being played can be started to be played from the frame paused in step S201. The image processing unit 104 resumes to read the refocusable RAW moving image from the recording medium 108 and updates the video signal output from the display device 105.

According to this exemplary embodiment, as described above, because a user can select a capturing format on the capturing format selection screen, a still image in a format intended by the user can be acquired.

According to this exemplary embodiment, for generation of a thumbnail image, a still image acquired by capturing can be easily searched by a user after captured.

Second Exemplary Embodiment

An image processing apparatus and an image processing method according to the second exemplary embodiment of the present disclosure will be described with reference to FIGS. 9 and 10. Like numbers refer to like parts that are identical in the image processing apparatus and image processing method according to the first exemplary embodiment illustrated in FIGS. 1 to 8 and in those of the second embodiments, and any repetitive descriptions will be omitted or simplified.

An image processing apparatus according to this exemplary embodiment is capable of capturing a still image being played of an MP4 moving image associated with a refocusable RAW moving image. A playback apparatus according to this exemplary embodiment is configured to play a developed moving image associated with a refocusable RAW moving image, instead of playback of a refocusable RAW moving image. Such a developed moving image may be an MP4 moving image, for example. An MP4 moving image is a compressed moving image in MPEG-4 format.

Figure 9A:
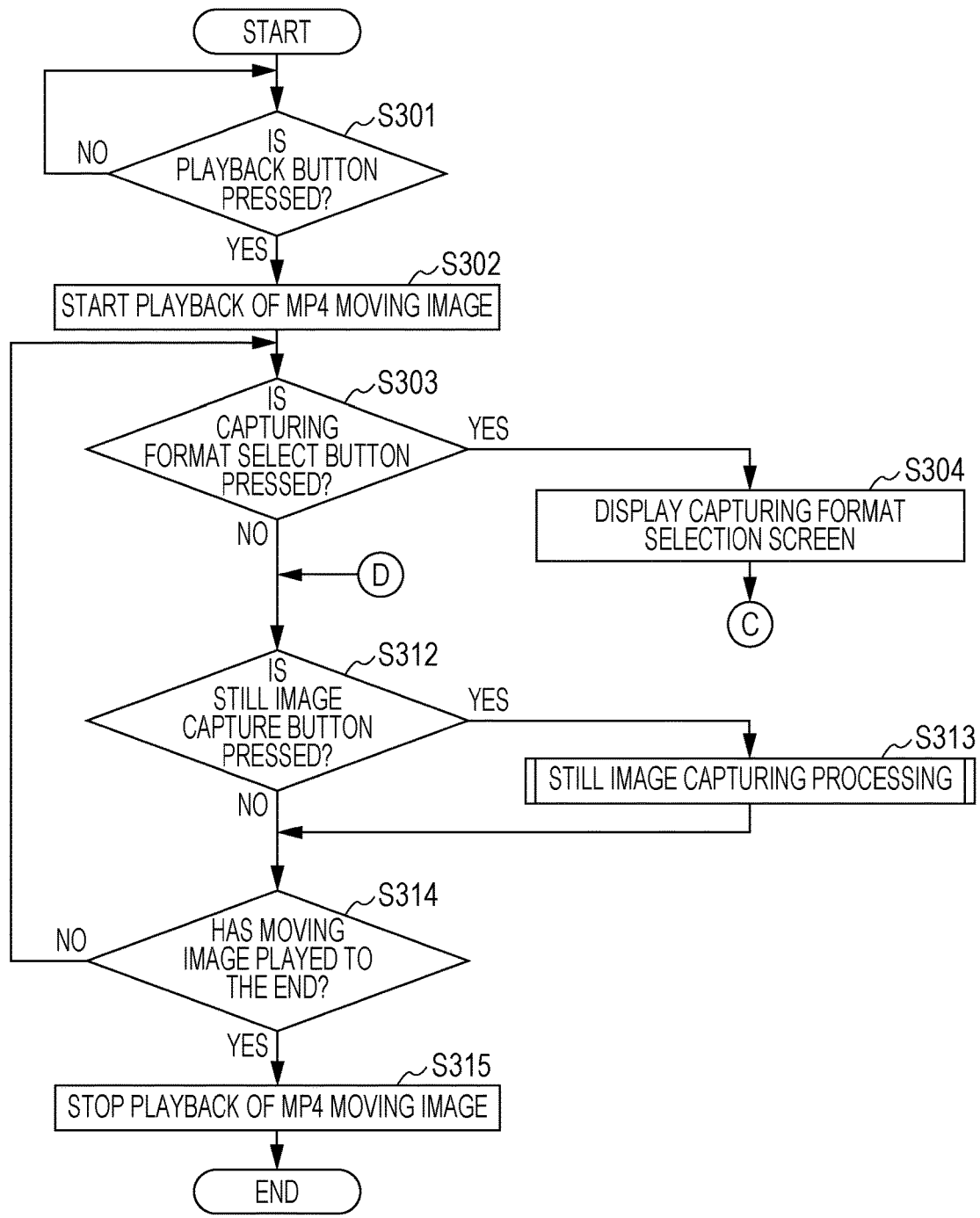
FIGS. 9A and 9B are flowcharts illustrating operations in the image processing apparatus according to a second exemplary embodiment of the present disclosure.
Figure 9B:
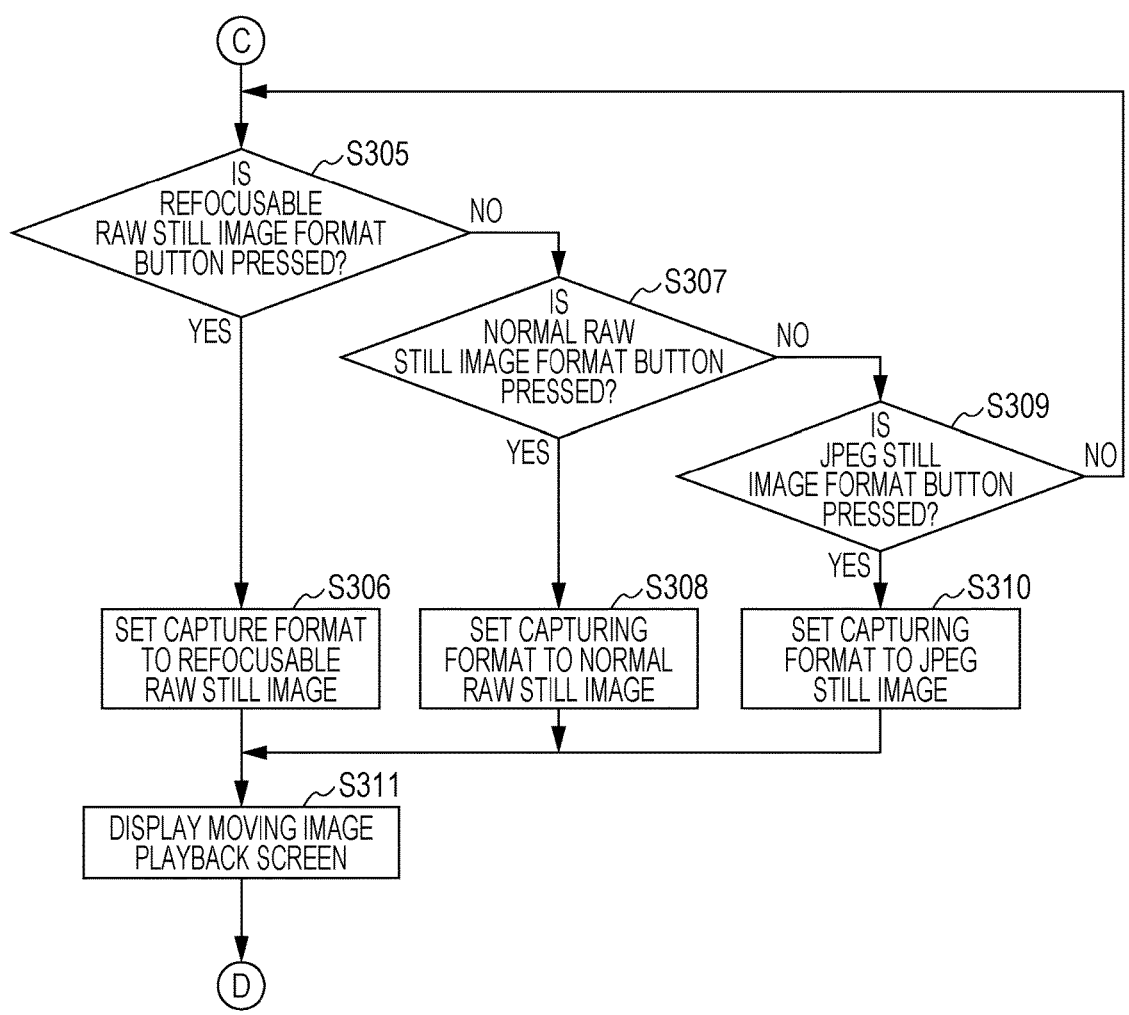
Figure 10:
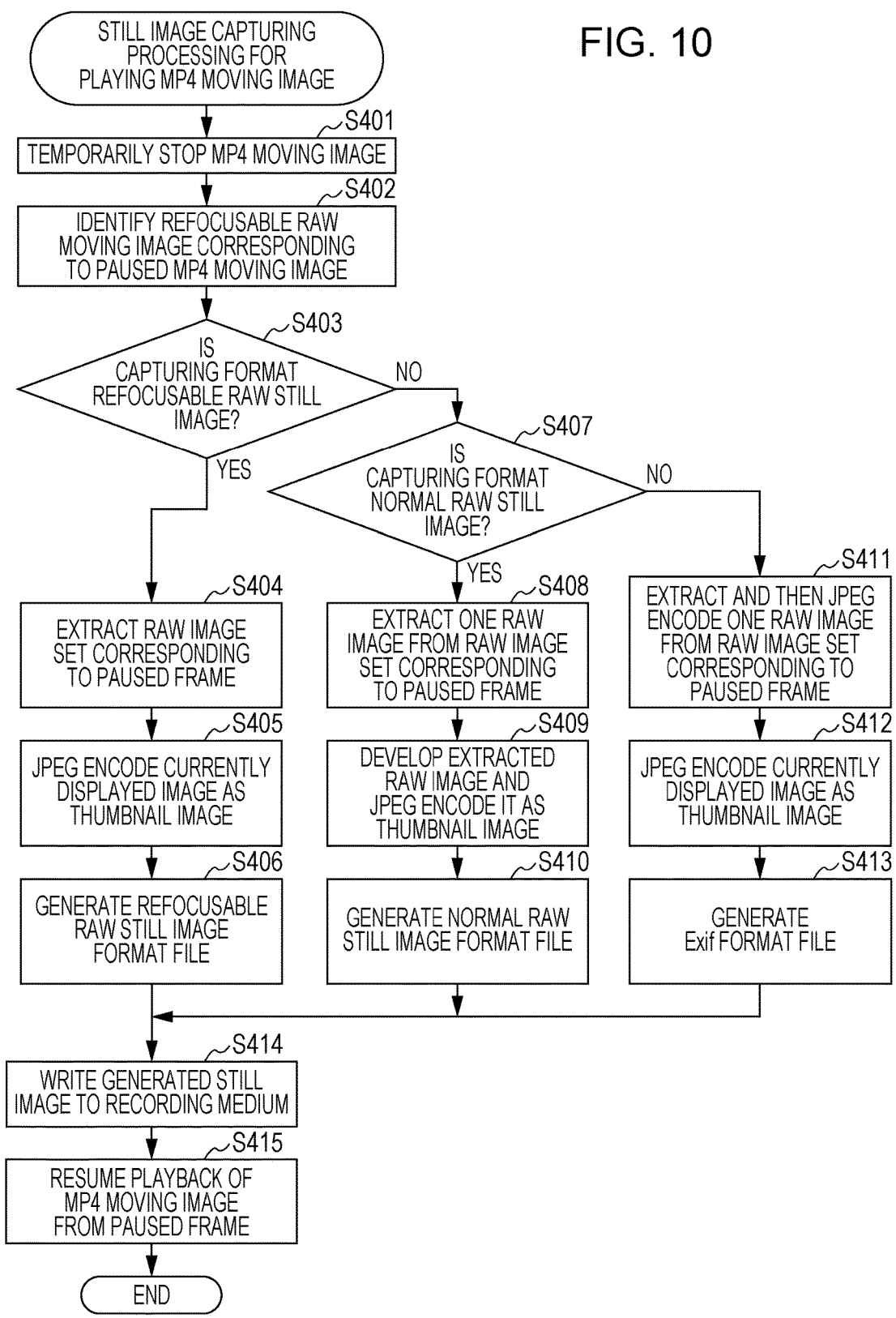
FIG. 10 is a flowchart illustrating still-image capturing processing to be performed in the image processing apparatus according to the second exemplary embodiment of the present disclosure.

FIGS. 9A and 9B are flowcharts illustrating operations in the image processing apparatus according to this exemplary embodiment.

In step S301, the CPU 101 determines whether the playback button 201 displayed on the touch panel 120 is pressed down or not. If the CPU 101 detects that the playback button 201 is pressed down (YES in step S301), the processing moves to step S302. If the CPU 101 does not detect that the playback button 201 is pressed down (NO in step S301), the processing stays in step S101.

In step S302, the CPU 101 controls the image processing unit 104 to play the MP4 moving image. The image processing unit 104 reads out the MP4 moving image from the recording medium 108 and performs decode processing on the MP4 moving image so that a displayable video signal can be generated, and the video signal can be output to the display device 105. Thus, the MP4 moving image is played on the display device 105.

In step S303, the CPU 101 determines whether the capturing format selection button 204 displayed on the touch panel 120 is pressed down or not. If the CPU 101 detects that the capturing format selection button 204 is pressed down (YES in step S303), the processing moves to step S304. On the other hand, if the CPU 101 does not detect that the capturing format selection button 204 is pressed down (NO in step S303), the processing moves to step S312.

In step S304, the CPU 101 controls the image processing unit 104 to display a capturing format selection screen. Thus, the capturing format selection screen is displayed on the display device 105. After that, the processing moves to step S305.

In step S305, the CPU 101 determines whether the refocusable RAW still image format button 301 displayed on the touch panel 120 is pressed down or not. If the CPU 101 detects that the refocusable RAW still image format button 301 is pressed down (YES in step S305), the processing moves to step S306. On the other hand, if the CPU 101 does not detect that the refocusable RAW still image format button 301 is pressed down (NO in step S305), the processing moves to step S307.

In step S306, the CPU 101 sets a capturing format for the refocusable RAW still image. More specifically, the CPU 101 writes to the memory 102 information describing that the capturing format is the refocusable RAW still image format. After that, the processing moves to step S311.

In step S307, the CPU 101 determines whether the normal RAW still image format button 302 displayed on the touch panel 120 is pressed down or not. If the CPU 101 detects that the normal RAW still image format button 302 is pressed down (YES in step S307), the processing moves to step S308. On the other hand, if the CPU 101 does not detect that the normal RAW still image format button 302 is pressed down (NO in step S307), the processing moves to step S309.

In step S308, the CPU 101 sets the capturing format to normal RAW still image. More specifically, the CPU 101 writes to the memory 102 information describing that the capturing format is the normal RAW still image format. After that, the processing moves to step S311.

In step S309, the CPU 101 determines whether the JPEG still image format button 303 displayed on the touch panel 120 is pressed down or not. If the CPU 101 detects that the JPEG still image format button 303 is pressed down (YES in step S309), the processing moves to step S310. On the other hand, if the CPU 101 does not detect that the JPEG still image format button 303 is pressed down (NO in step S309), the processing returns to step S305.

In step S310, the CPU 101 sets the capturing format to JPEG still image. More specifically, the CPU 101 writes to the memory 102 information describing that the capturing format is the JPEG still image format. After that, the processing moves to step S311.

In step S311, the CPU 101 controls the image processing unit 104 to display a moving-image playback screen. Thus, the moving-image playback screen is displayed on the display device 105. After that, the processing moves to step S312.

In step S312, the CPU 101 determines whether a still image capture button (not illustrated) provided in the operating unit 106 is pressed down or not. If the CPU 101 detects that the still image capture button is pressed down (YES in step S312), the processing moves to step S313. On the other hand, if the CPU 101 does not detect that the still image capture button is pressed down (NO in step S312), the processing moves to step S314.

In step S313, the CPU 101 performs still-image capturing processing such that a still image file in a format based on a preset capturing format can be generated. As described above, information describing the preset capturing format is stored in the memory 102. Details of the still-image capturing processing will be described below with reference to FIG. 10.

In step S314, the CPU 101 inquires of the image processing unit 104 whether the refocusable RAW moving image has been played to the end or not. If the refocusable RAW moving image has been played to the end (YES in step S314), the processing moves to step S315. On the other hand, if the refocusable RAW moving image has not been played to the end (NO in step S314), the processing returns to step S303.

In step S315, the CPU 101 stops the playback of the MP4 moving image.

Next, the still-image capturing processing will be described with reference to FIG. 10. FIG. 10 is a flowchart illustrating still-image capturing processing to be performed in the image processing apparatus according to this exemplary embodiment.

In step S401, the CPU 101 controls the image processing unit 104 such that the MP4 moving image that is currently being played can be paused. The image processing unit 104 stops reading the MP4 moving image from the recording medium 108 and operates to directly hold the video signal being currently output to the display device 105. After that, the processing moves to step S402.

In step 402, the CPU 101 identifies a refocusable RAW moving image corresponding to an MP4 moving image that is being currently paused among refocusable RAW moving images saved in the recording medium 108. An identical file name excluding an extension, for example, is set for moving image files that are associated with each other. For example, a file name "chapter 01.raw", for example, may be set for a refocusable RAW moving image file associated with an MP4 moving image file having a file name "chapter 01.mp4". The CPU 101 searches a refocusable RAW moving image file associated with an MP4 moving image that is currently being paused from files saved in the recording medium 108 and holds the file readily accessible. However, file names of moving images that are associated with each other are not limited to the examples above.

In step S403, the CPU 101 reads out from the memory 102 information describing a preset capturing format. The CPU 101 determines whether the preset capturing format is the refocusable RAW still image format or not. If the preset capturing format is the refocusable RAW still image format (YES in step S403), the processing moves to step S404. On the other hand, if the capturing format is not the refocusable RAW still image format (NO in step S403), the processing moves to step S407.

In step S404, the CPU 101 accesses a region recording a refocusable RAW moving image in the recording medium 108. A RAW image set corresponding to the paused frame being currently displayed on the display device 105 is extracted from the recording medium 108, and the extracted RAW image set is copied to the memory 102. After that, the processing moves to step S405.

In step S405, the CPU 101 controls the image processing unit 104 such that the image being currently displayed on the display device 105 can be JPEG-encoded as a thumbnail image. The image processing unit 104 JPEG-encodes a video signal currently output to the display device 105 and stores the encoded JPEG data to the memory 102. After that, the processing moves to step S406.

In step S406, the CPU 101 accesses the memory 102, and the CPU 101 combines the RAW image set copied to the memory 102 in step S203 and the JPEG data stored in the memory 102 in step S204. The CPU 101 generates a file in the refocusable RAW still image format and stores the generated file to the memory 102. After that, the processing moves to step S414.

In step S407, the CPU 101 reads out from the memory 102 information describing the preset capturing format. Then, the CPU 101 determines whether the preset capturing format is the normal RAW still image format or not. If the set capturing format is the normal RAW still image format (YES in step S407), the processing moves to step S408. On the other hand, if the set capturing format is not the normal RAW still image format (NO in step S407), the processing moves to step S411.

In step S408, the CPU 101 accesses a region recording the refocusable RAW moving image in the recording medium 108. The CPU 101 extracts one RAW image from the RAW image set corresponding to the paused frame being currently displayed on the display device 105 and copies the extracted RAW image to the memory 102. After that, the processing moves to step S409.

In step S409, the CPU 101 controls the image processing unit 104 such that the RAW image copied to the memory 102 in step S408 can be JPEG-encoded as a thumbnail image. The image processing unit 104 accesses the memory 102, performs a development process on the RAW image copied in step S102, then JPEG-encodes the developed image, and stores the encoded JPEG data to the memory 102. After that, the processing moves to step S410.

In step S410, the CPU 101 accesses the memory 102 and combines the one RAW image copied in step S408 and the JPEG data stored in step S409. The CPU 101 then generates a normal RAW still image format file and stores the generated file to the memory 102. After that, the processing moves to step S414.

In step S411, the CPU 101 accesses a region recording the refocusable RAW moving image identified in step S402 in the recording medium 108. The CPU 101 extracts one RAW image from the RAW image set corresponding to the paused frame being currently displayed on the display device 105 and copies the extracted RAW image to the memory 102. After that, the extracted RAW image is developed, and the developed RAW image is JPEG-encoded. The encoded JPEG data or main image data in JPEG format are stored in the memory 102. After that, the processing moves to step S412.

In step S412, the CPU 101 controls the image processing unit 104 to JPEG-encode an image being currently displayed on the display device 105 as a thumbnail image. The image processing unit 104 JPEG-encodes a video signal being currently output to the display device 105 and stores the encoded JPEG data in the memory 102. After that, the processing moves to step S413.

In step S413, the CPU 101 accesses the memory 102 and performs processing as follows. That is, the CPU 101 combines the JPEG data or main image data in JPEG format stored in memory 102 in step S411 and JPEG data for a thumbnail image stored in the memory 102 in step S412. Thus, the CPU 101 generates a file in Exif format, for example, and stores the file in the memory 102. After that, the processing moves to step S414.

In step S414, the CPU 101 reads out from the memory 102 the file generated in step S406, step S410, or step S413 and stored in the memory 102. The CPU 101 writes the file read out from the memory 102 to the recording medium 108.

In step S415, the CPU 101 controls the image processing unit 104 such that the MP4 moving image that is currently being played can be started to be played from the frame paused in step S401. The image processing unit 104 resumes to read the refocusable RAW moving image from the recording medium 108 and updates the video signal output from the display device 105.

A still image may be acquired by capturing from a refocusable RAW moving image while a developed moving image associated with the refocusable RAW moving image is being played, as described above. A data format of a still image may be designated in advance, and a still image is generated in the designated format so that still image data in a format intended by a user can be acquired.

Third Exemplary Embodiment

Figure 11:
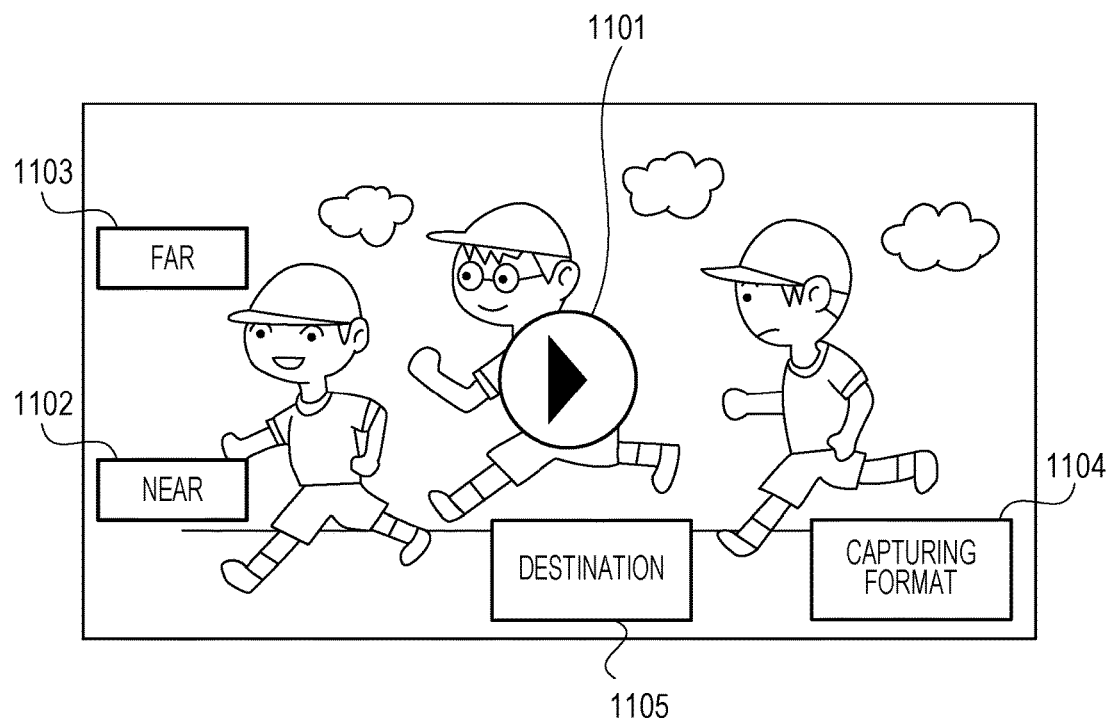
FIG. 11 illustrates an example display of a moving-image playback screen in the image processing apparatus according to a third exemplary embodiment of the present disclosure.
Figure 12:
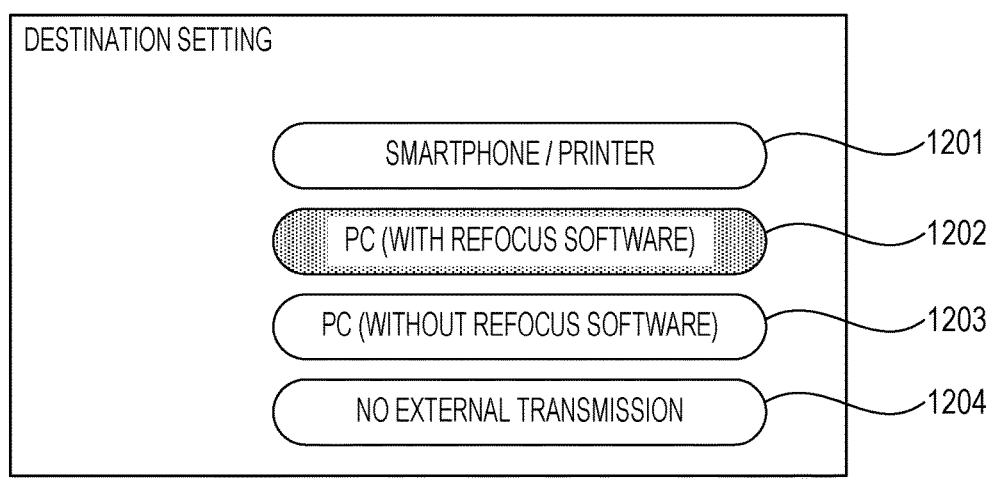
FIG. 12 illustrates an example display of a destination setting screen in the image processing apparatus according to the third exemplary embodiment of the present disclosure.
Figure 13A:
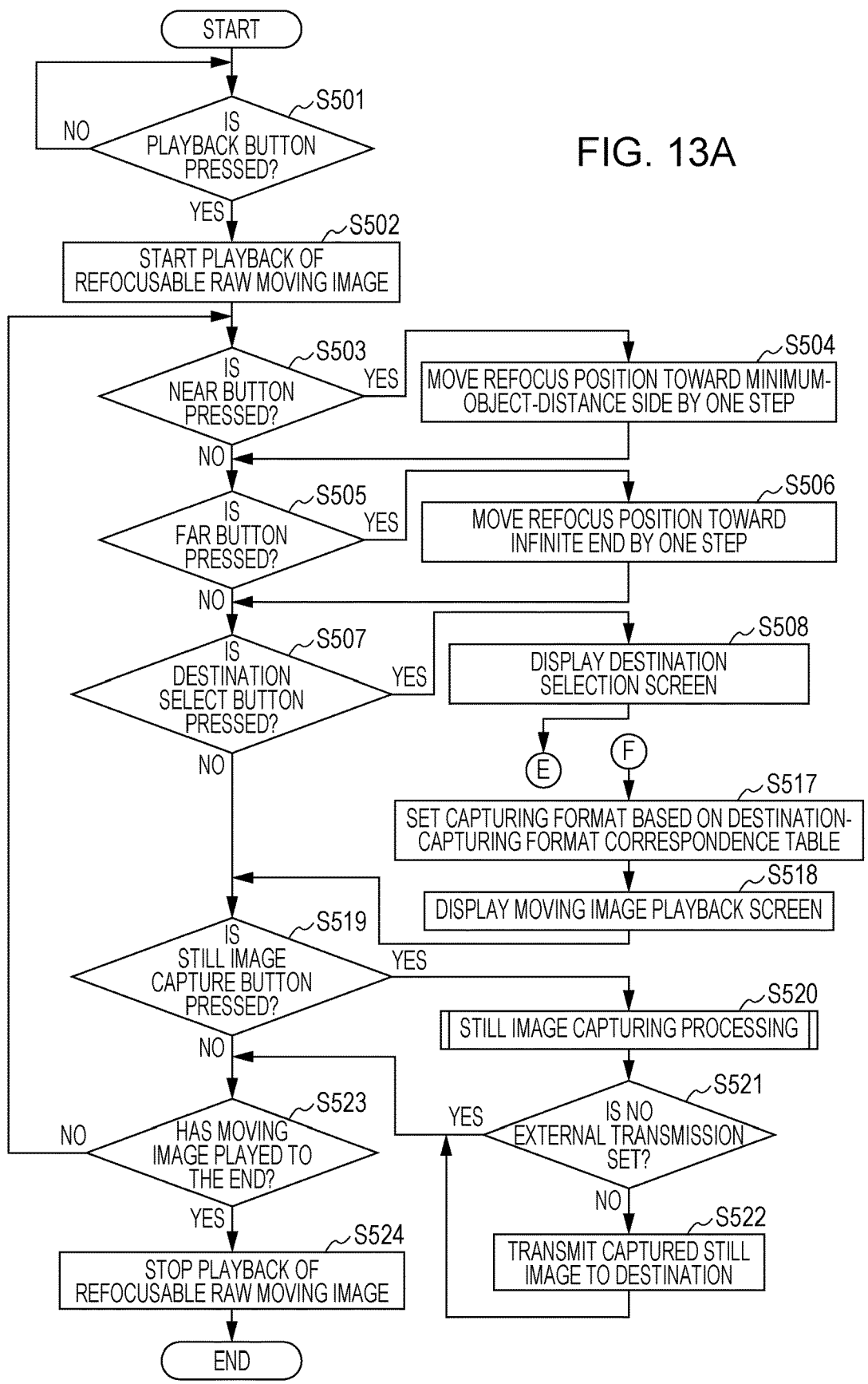
FIG. 13A is a flowchart illustrating operations in the image processing apparatus according to the third exemplary embodiment of the present disclosure.

An image processing apparatus according to a third exemplary embodiment of the present disclosure and image processing method will be described with reference to FIG. 11 to FIG. 13B. FIG. 11 illustrates an example display of a moving-image playback screen in the image processing apparatus according to this exemplary embodiment. FIG. 12 illustrates an example display of a destination setting screen in the image processing apparatus according to this exemplary embodiment. FIGS. 13A and 13B are flowcharts illustrating operations in the image processing apparatus according to this exemplary embodiment. Like numbers refer to like parts in the image processing apparatus and image processing method according to the first or second exemplary embodiment illustrated in FIG. 1 to FIG. 10 and those this embodiment illustrated in FIG. 11 to FIG. 13B, and any repetitive descriptions will be omitted or simplified.

The image processing apparatus according to this exemplary embodiment determines a data format of still image data on basis of a destination.

As illustrated in FIG. 11, the touch panel 120 displays a moving-image playback screen including a playback button 1101, a NEAR button 1102, a FAR button 1103, a capturing format selection button 1104, and a destination select button 1105, for example.

As illustrated in FIG. 13A, in step S501, the CPU 101 determines whether the playback button 1101 displayed on the touch panel 120 is pressed down or not. If the CPU 101 detects that the playback button 1101 is pressed down (YES in step S501), the processing moves to step S102. If the CPU 101 does not detect that the playback button 1101 is pressed down (NO in step S501), the processing stays in step S501.

In step S502, the CPU 101 controls the image processing unit 104 to play a refocusable RAW moving image. The image processing unit 104 reads out a refocusable RAW moving image from the recording medium 108 and performs a development process on the refocusable RAW moving image so that a displayable video signal can be generated. Then, the video signal can be output to the display device 105. Thus, the refocusable RAW moving image is played on the display device 105.

In step S503, the CPU 101 determines whether the NEAR button 1102 (see FIG. 12) displayed on the touch panel 120 is pressed down or not. If the CPU 101 detects that the NEAR button 1102 is pressed down (YES in step S503), the processing moves to step S504. On the other hand, if the CPU 101 does not detect that the NEAR button 1102 is pressed down (NO in step S503), the processing moves to step S505.

In step S504, the CPU 101 controls the image processing unit 104 such that the refocus position of the refocusable RAW moving image can be moved toward the minimum-object-distance side by one step from the current position. The image processing unit 104 reads out the current refocus position from the memory 102. The image processing unit 104 moves the refocus position toward the minimum-object-distance side by one step from the current refocus position in frames subsequent to the frame being played currently for performing a development process. The CPU 101 stores the refocus position after the movement in the memory 102. After that, the processing moves to step S505.

In step S505, the CPU 101 determines whether the FAR button 1103 displayed on the touch panel 120 is pressed down or not. If the CPU 101 detects that the FAR button 1103 is pressed down (YES in step S505), the processing moves to step S506. On the other hand, if the CPU 101 does not detect that the FAR button 1103 is pressed down (NO in step S505), the processing moves to step S507.

In step S506, the CPU 101 controls the image processing unit 104 such that the refocus position of the refocusable RAW moving image can be moved toward the infinite end by one step from the current position. The image processing unit 104 reads out the current refocus position from the memory 102. The image processing unit 104 moves the refocus position toward the infinite end side by one step from the current refocus position in frames subsequent to the frame being played currently for performing a development process. The CPU 101 stores the refocus position after the movement in the memory 102. After that, the processing moves to step S507.

In step S507, the CPU 101 determines whether the destination select button 1105 displayed on the touch panel 120 is pressed down or not. If the CPU 101 detects that the destination select button 1105 is pressed down (YES in step S507), the processing moves to step S508. On the other hand, if the CPU 101 does not detect that the destination select button 1105 is pressed down (NO in step S507), the processing moves to step S519. The display device 105 displaying a destination setting screen, the touch panel 120 and the CPU 101 in collaboration may function as a destination setting unit configured to set a destination.

In step S508, the CPU 101 controls the image processing unit 104 to display the destination selection screen. Thus, the destination selection screen is displayed on the display device 105. The destination may be an external device such as a smart phone, a printer, or a PC (personal computer). As illustrated in FIG. 12, the destination selection screen may display, for example, a smart phone/printer button 1201, a PC (with refocus software) button 1202, a PC (without refocus software) button 1203, a no external transmission button 1204. After that, the processing moves to step S509 (see FIG. 13B).

If the destination is a smart phone or a printer, a user may press down the smart phone/printer button 1201. In step S509, the CPU 101 determines whether the smart phone/printer button 1201 displayed on the touch panel 120 is pressed down or not. If the CPU 101 detects that the smart phone/printer button 1201 is pressed down (YES in step S509), the processing moves to step S510. On the other hand, if the CPU 101 does not detect that the smart phone/printer button 1201 is pressed down (NO in step S509), the processing moves to step S510.

In step S510, the CPU 101 sets the destination to smart phone/printer. More specifically, the CPU 101 writes to the memory 102 information describing that the destination is smart phone/printer. After that, the processing moves to step S517 (see FIG. 13A).

If the destination is a PC in which refocus software is installed, a user may press down the PC (with refocus software) button 1202. In step S511, the CPU 101 determines whether the PC (with refocus software) button 1202 displayed on the touch panel 120 is pressed down or not. If the CPU 101 detects that the PC (with refocus software) button 1202 is pressed down (YES in step S511), the processing moves to step S512. On the other hand, if the CPU 101 does not detect that the PC (with refocus software) button 1202 is pressed down (NO in step S511), the processing moves to step S513.

In step S512, the CPU 101 sets the destination to a PC in which the refocus software is installed. More specifically, the CPU 101 writes to the memory 102 information describing that the PC (with refocus software) is the destination. After that, the processing moves to step S517.

If the destination is a PC in which the refocus software is not installed, a user may press down the PC (without refocus software) button 1203. In step S513, the CPU 101 determines whether the PC (without refocus software) button 1203 displayed on the touch panel 120 is pressed down or not. If the CPU 101 detects that the PC (without refocus software) button 1203 is pressed down (YES in step S513), the processing moves to step S514. On the other hand, if the CPU 101 does not detect that the PC (without refocus software) button 1203 is pressed down (NO in step S513), the processing moves to step S515.

In step S514, the CPU 101 sets the destination to a PC in which the refocus software is not installed. More specifically, the CPU 101 writes to the memory 102 information describing a PC (without refocus software) is the destination. After that, the processing moves to step S517.

If the image of the interest is not to be transmitted externally, a user may press down the no external transmission button 1204. In step S515, the CPU 101 determines whether the no external transmission button 1204 displayed on the touch panel 120 is pressed down or not. If the CPU 101 detects that the no external transmission button 1204 is pressed down (YES in step S515), the processing moves to step S516. On the other hand, if the CPU 101 does not detect that the no external transmission button 1204 is pressed down (NO in step S515), the processing returns to step S509.

In step S516, the CPU 101 sets not to perform external transmission. More specifically, the CPU 101 writes to the memory 102 information describing that no external transmission is performed. After that, the processing moves to step S517.

In step S517, the CPU 101 sets a capturing format on basis of a table defining correspondences between destinations and capturing formats or a destination-capturing format correspondence table. The destination-capturing format correspondence table defines correspondences as follows, for example. For example, the capturing format in a case where the destination is smart phone/printer is defined to be a JPEG still image format. The capturing format in a case where the destination is PC (with refocus software) is defined to be refocusable RAW still image. The capturing format in a case where the destination is PC (without refocus software) is defined to be normal RAW still image. The capturing format in a case where no external transmission is performed is defined to be a capturing format selected through the capturing format selection screen (see FIG. 3). Because the selection of a capturing format through the capturing format selection screen has been described according to the first exemplary embodiment above, any repetitive description will be omitted. The CPU 101 determines the capturing format on basis of the destination-capturing format correspondence table and stores the determined capturing format in the memory 102. As a result, the capturing format is set.

In step S518, the CPU 101 controls the image processing unit 104 to display the moving-image playback screen. Thus, the moving-image playback screen is displayed on the display device 105. After that, the processing moves to step S519.

In step S519, the CPU 101 determines whether a still image capture button (not illustrated) provided in the operating unit 106 is pressed down or not. If the CPU 101 detects that the still image capture button is pressed down (YES in step S519), the processing moves to step S520. On the other hand, if the CPU 101 does not detect that the still image capture button is pressed down (NO in step S519), the processing moves to step S523. The still image capture button provided in the operating unit 106 functions as an instructing unit configured to instruct to generate still image data.

In step S520, the CPU 101 performs still-image capturing processing to generate a still image file in a format based on a preset capturing format. As described above, information describing the preset capturing format is stored in the memory 102. Because details of the still-image capturing processing have been described according to the first exemplary embodiment with reference to FIG. 5, any repetitive description will be omitted. After the still-image capturing processing ends, the processing moves to step S521.

In step S521, the CPU 101 determines whether no external transmission is set or not. If no external transmission is set (YES in step S521), the processing moves to step S523. On the other hand, if no external transmission is not set (NO in step S521), the processing moves to step S522.

In step S522, the captured still image data are transmitted to the destination. The image processing apparatus according to this exemplary embodiment may transmit the still image data to an external device being the selected destination through wired connection or wireless connection via the external I/F 109, for example. The external I/F 109 functions as a transmitting unit configured to transmit still image data to a destination. The wired connection may be connection via a USB cable, for example. The wireless connection may be a connection using Wi-Fi, for example. After that, the processing moves to step S523.

In step S523, the CPU 101 inquires of the image processing unit 104 whether the refocusable RAW moving image has been played to the end or not. If the refocusable RAW moving image has been played to the end (YES in step S523), the processing moves to step S524. On the other hand, if the refocusable RAW moving image has not been played to the end (NO in step S523), the processing returns to step S503.

In step S524, the CPU 101 stops the playback of the refocusable RAW moving image.

A data format of still image data may be determined in accordance with a destination thereof.

Exemplary Variation Embodiments

Having described the exemplary embodiments of the present disclosure in detail, the present invention is not limited to those specific exemplary embodiments. Various changes without departing from the spirit and scope of the invention are included in the present invention. For example, parts of the exemplary embodiments may be combined.

According to the aforementioned exemplary embodiments, a plurality of selection items, that is, the refocusable RAW still image format button 301, the normal RAW still image format button 302 and the JPEG still image format button 303 are displayed on the capturing format selection screen. According to the aforementioned exemplary embodiments, one of a plurality of selection items may be selected to determine a data format. However, an embodiment of the present disclosure is not limited thereto. A plurality of operating members usable for selecting a capturing format may be provided in the operating unit 106, and a data format may be determined on basis of a selective operation performed on one of the operating members. In other words, the determining unit configured to determine a data format of still image data may selectively determine a data format among a plurality of data formats on basis of a selective operation on one of the plurality of operating members.

Having described that, according to the aforementioned exemplary embodiments, the selection of a capturing format and the capturing are performed separately, an embodiment of the present disclosure is not limited thereto. A capturing format can be selected when the capturing is performed. In other words, the capturing may be performed in response to a user's selection of a selection item or an operating member for selecting a capturing format. In this case, a determining unit configured to determine a data format of still image data may also function as an instructing unit configured to instruct to generate still image data. For example, when the refocusable RAW still image format button 301 is pressed down, a refocusable RAW still image may be captured from refocusable RAW moving image data. Alternatively, when the normal RAW still image format button 302 is pressed down, a normal RAW still image may be captured from refocusable RAW moving image data. When the JPEG still image format button 303 is pressed down, a JPEG still image may be captured from refocusable RAW moving image data.

Having described, according to the aforementioned exemplary embodiments, the image processing apparatus 100 has the image capturing unit 112, for example, an embodiment of the present disclosure is not limited thereto. The image processing apparatus 100 may not have the image capturing unit 112.

Having described that, according to the aforementioned exemplary embodiments, when the capturing format is the JPEG still image format, still image data include one main image data set in the JPEG format, an embodiment of the present disclosure is not limited thereto. For example, each of a plurality of RAW images included in a frame to be captured is JPEG-encoded to generate a plurality of main image data sets in JPEG format, and the plurality of main image data sets may be included in the still image data.

Having described that, according to the aforementioned exemplary embodiments, a thumbnail image is generated from a video signal output to the display device 105, an embodiment of the present disclosure is not limited thereto. In other words, the focal position of the thumbnail image may be a predetermined focal position not related to the focal position set based on an operation on one of the FAR buttons 203 and 1103 and the NEAR buttons 202 and 1102. For example, for any type of capturing, the focal position of a thumbnail image may be the minimum-object distance position. For any type of capturing, thumbnail images at an identical focal position may be generated so that thumbnail images of all of captured still image data may be captured under equal conditions to be listed.

One or more embodiments of the present disclosure may be implemented by processing of reading and executing a program for implementing one or more functions of any of the aforementioned exemplary embodiments, which is supplied to a system or an apparatus over a network or through a storage medium and is performed by one or more processors in a computer in the system or apparatus. Alternatively, it may be implemented by a circuit (such as an ASIC) implementing the one or more functions.

According to the present disclosure, because a user can determine a data format of still image data generated from un-development moving image data having a readjustable focal position, still image data in a data format intended by the user can be acquired.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-226723, filed Nov. 19, 2015, which is hereby incorporated by reference herein in its entirety.

What is claimed is:

1. An image processing apparatus comprising:
one or more processors; and
a memory storing instructions which, when the instructions are executed by the one or more processors, cause the image processing apparatus to:
selectively determine from a plurality of data formats a data format of still image data generated from un-development moving image data not having undergone a development process and stored in a memory;
instruct to output the still image data;
generate from the un-development moving image data the still image data in the determined data format in a case where the image processing apparatus instructs to output the still image data; and
output the generated still image data,
wherein the un-development moving image data include a plurality of view point images acquired by capturing frames at a plurality of view points; and
the plurality of data formats include a data format that is the plurality of un-development view point images and a data format acquired by synthesizing the plurality of un-development view point images.

2. The image processing apparatus according to claim 1, wherein the plurality of data formats include a data format of an un-development still image and a data format of a developed still image.

3. The image processing apparatus according to claim 1, wherein the image processing apparatus further operates to play moving image data corresponding to the un-development moving image data, and
the image processing apparatus generates from the un-development moving image data the still image data in the determined data format in a case where the image processing apparatus instructs to output the still image data while the image processing apparatus is playing moving image data corresponding to the un-development moving image data.

4. The image processing apparatus according to claim 3, wherein the image processing apparatus reads out the un-development moving image data from the memory, develops and plays the un-development moving image data.

5. The image processing apparatus according to claim 3, wherein the image processing apparatus plays developed moving image data associated with the un-development moving image data.

6. The image processing apparatus according to claim 1, wherein the un-development moving image data include frames each being light field data; and
the plurality of data formats include a data format being light field data and a data format converted from the light field data and having a focal position that is not readjustable.

7. The image processing apparatus according to claim 6, wherein the image processing apparatus further operates to play moving image data corresponding to the un-development moving image data, and
wherein, in a case where an instruction is given to adjust the focal position while the image processing apparatus is playing moving image data corresponding to the un-development moving image data, the image processing apparatus generates still image data in the determined data format and reflecting the instruction.

8. The image processing apparatus according to claim 1, wherein the image processing apparatus selectively determines from the plurality of data formats the data format of the still image data generated from the un-development moving image data on a basis of a selective operation input to select one of the plurality of data formats.

9. The image processing apparatus according to claim 8, wherein the selective operation input is performed by selectively operating one of a plurality of operating members.

10. The image processing apparatus according to claim 1, wherein the image processing apparatus further operates to transmit the generated still image data to an external destination;
wherein the image processing apparatus further operates to set the destination; and
wherein the image processing apparatus selectively determines from the plurality of data formats the data format of the still image data generated from the un-development moving image data in accordance with the set destination.

11. An image processing apparatus comprising:
one or more processors; and a memory storing instructions which, when the instructions are executed by the one or more processors, cause the image processing apparatus to:

selectively determine from a plurality of data formats a data format of still image data generated from RAW moving image data stored in a memory;

instruct to output the still image data;

generate from the RAW moving image data the still image data in the determined data format in a case where the image processing apparatus instructs to output the still image data; and output the generated still image data, wherein the RAW moving image data include a plurality of view point images acquired by capturing frames at a plurality of view points; and the plurality of data formats include a data format that is the plurality of RAW view point images and a data format acquired by synthesizing the plurality of RAW view point images.

12. The image processing apparatus according to claim 11, wherein the plurality of data formats include a data format recorded as a RAW image and a data format that is image processed and recorded in JPEG.

13. A control method for an image processing apparatus having at least one processor, the method comprising:

selectively determining, via the at least one processor, from a plurality of data formats a data format of still image data generated from un-development moving image data not having undergone a development process;

instructing, via the at least one processor, to output the still image data;

generating, via the at least one processor, from the un-development moving image data the still image data in the data format determined by the determining step in a case where the instructing step instructs to output the still image data; and outputting, via the at least one processor, the still image data generated by the generating step, wherein the un-development moving image data include a plurality of view point images acquired by capturing frames at a plurality of view points; and the plurality of data formats include a data format that is the plurality of un-development view point images and a data format acquired by synthesizing the plurality of un-development view point images.

14. A control method for an image processing apparatus having at least one processor, the method comprising:

selectively determining, via the at least one processor, from a plurality of data formats a data format of still image data generated from RAW moving image data;

instructing, via the at least one processor, to output the still image data;

generating, via the at least one processor, from the RAW moving image data the still image data in the data format determined by the determining step in a case where the instructing step instructs to output the still image data; and outputting, via the at least one processor, the still image data generated by the generating step, wherein the RAW moving image data include a plurality of view point images acquired by capturing frames at a plurality of view points; and the plurality of data formats include a data format that is the plurality of RAW view point images and a data format acquired by synthesizing the plurality of RAW view point images.

15. A non-transitory computer-readable recording medium recording a program causing a computer to execute a method, the method comprising:

selectively determining from a plurality of data formats a data format of still image data generated from un-development moving image data not having undergone a development process;

instructing to output the still image data;

generating from the un-development moving image data the still image data in the data format determined by the determining step in a case where the instructing step instructs to output the still image data; and outputting the still image data generated by the generating step, wherein the un-development moving image data include a plurality of view point images acquired by capturing frames at a plurality of view points; and the plurality of data formats include a data format that is the plurality of un-development view point images and a data format acquired by synthesizing the plurality of un-development view point images.

16. A non-transitory computer-readable recording medium recording a program causing a computer to execute a method, the method comprising:

selectively determining from a plurality of data formats a data format of still image data generated from RAW moving image data;

instructing to output the still image data;

generating from the RAW moving image data the still image data in the data format determined by the determining step in a case where the instructing step instructs to output the still image data; and outputting the still image data generated by the generating step, wherein the RAW moving image data include a plurality of view point images acquired by capturing frames at a plurality of view points; and the plurality of data formats include a data format that is the plurality of RAW view point images and a data format acquired by synthesizing the plurality of RAW view point images.

17. An image processing apparatus comprising:

one or more processors; and a memory storing instructions which, when the instructions are executed by the one or more processors, cause the image processing apparatus to:

selectively determine from a plurality of data formats a data format of still image data generated from un-development moving image data not having undergone a development process and stored in a memory;

instruct to output the still image data;

generate from the un-development moving image data the still image data in the determined data format in a case where the image processing apparatus instructs to output the still image data; and output the generated still image data, wherein the image processing apparatus further operates to transmit the generated still image data to an external destination, wherein the image processing apparatus further operates to set the destination, and wherein the image processing apparatus selectively determines from the plurality of data formats the data format of the still image data generated from the un-development moving image data in accordance with the set destination.

18. A control method for an image processing apparatus having at least one processor, the method comprising:
selectively determining, via the at least one processor, from a plurality of data formats a data format of still image data generated from RAW moving image data;
instructing, via the at least one processor, to output the still image data;
generating, via the at least one processor, from the RAW moving image data the still image data in the data format determined by the determining step in a case where the instructing step instructs to output the still image data;
outputting, via the at least one processor, the still image data generated by the generating step;
operating to transmit the generated still image data to an external destination;
operating to set the destination; and
selectively determining from the plurality of data formats the data format of the still image data generated from the un-development moving image data in accordance with the set destination.

* * * * *